Dec. 30, 1969　　　C. B. SIEBER　　　3,486,569

IMPACT MECHANISM

Filed May 6, 1968　　　　　　　　　　　　5 Sheets-Sheet 1

INVENTOR

CHARLES B. SIEBER

BY Joseph R. Slotnik

ATTORNEY

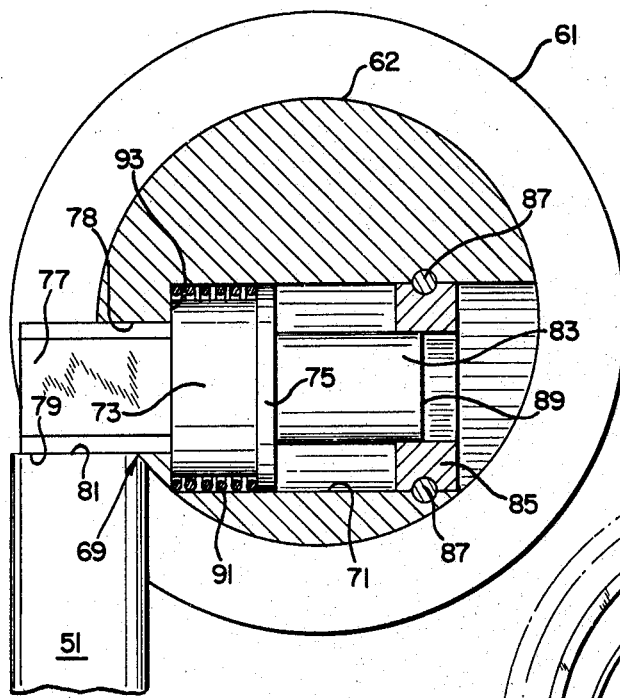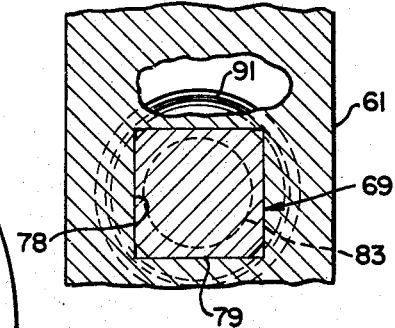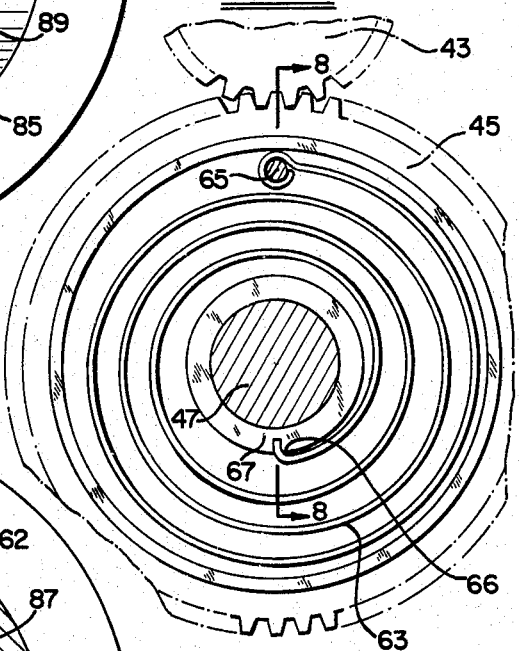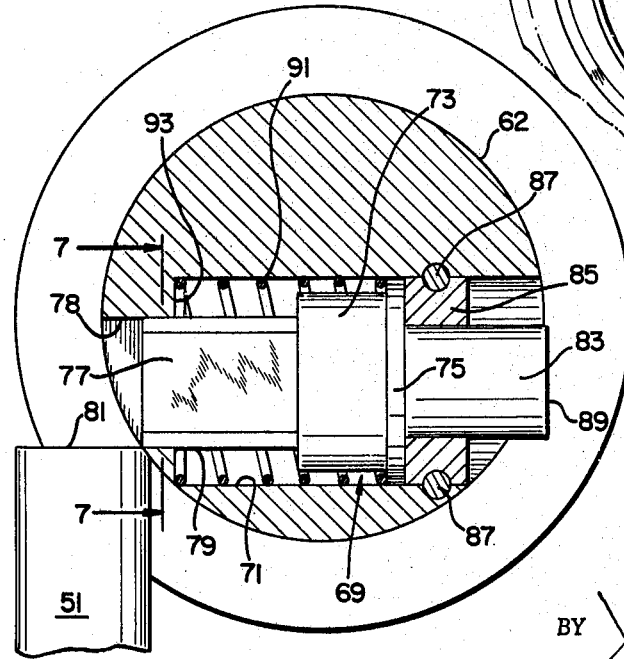

Dec. 30, 1969    C. B. SIEBER    3,486,569
IMPACT MECHANISM

Filed May 6, 1968    5 Sheets-Sheet 3

INVENTOR
CHARLES B. SIEBER
BY Joseph R. Slotnik
ATTORNEY

Dec. 30, 1969     C. B. SIEBER     3,486,569
IMPACT MECHANISM
Filed May 6, 1968     5 Sheets-Sheet 4
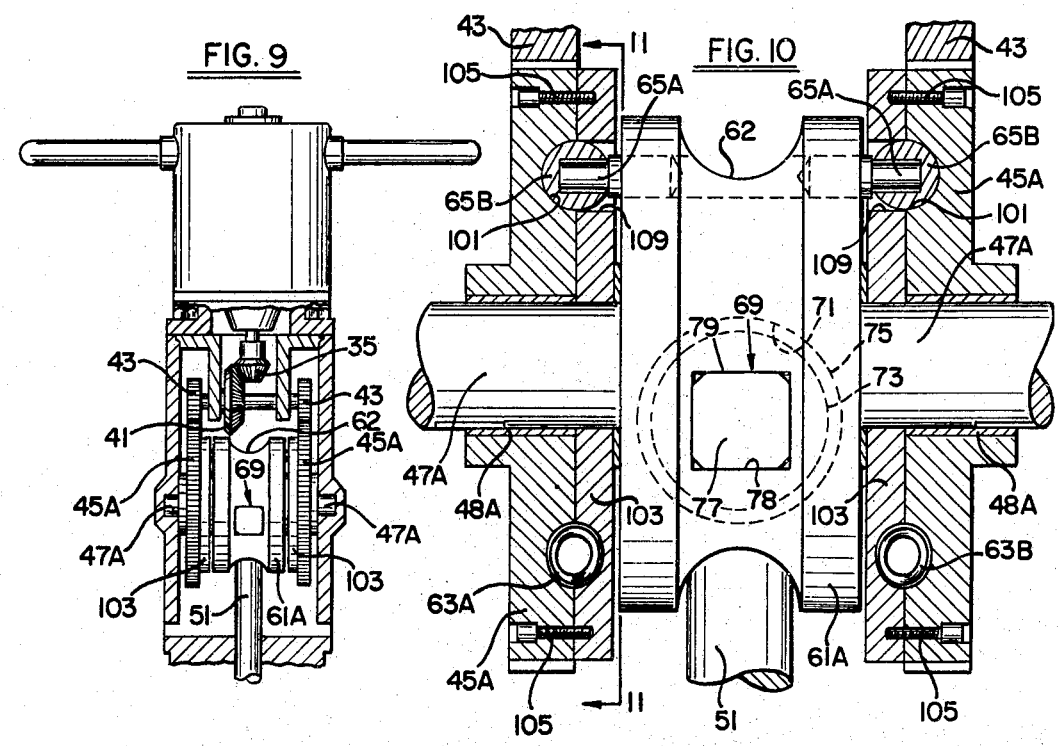
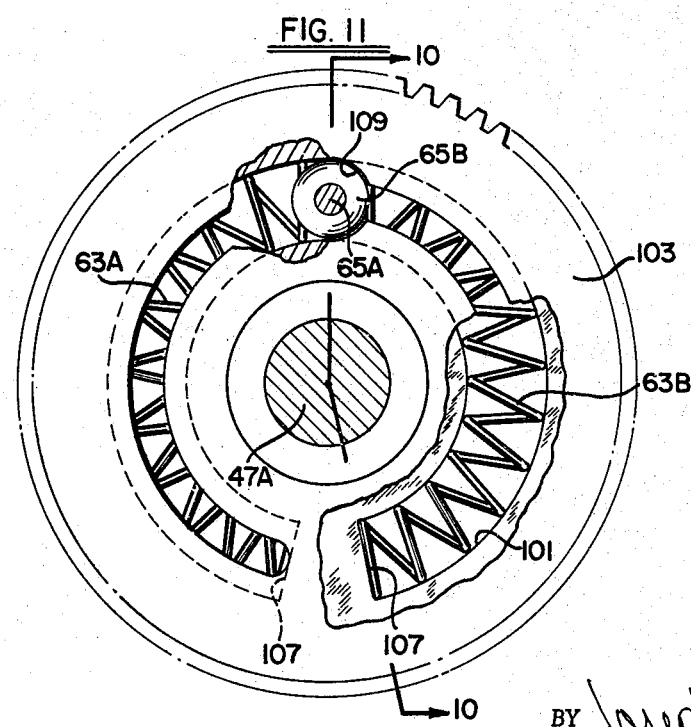
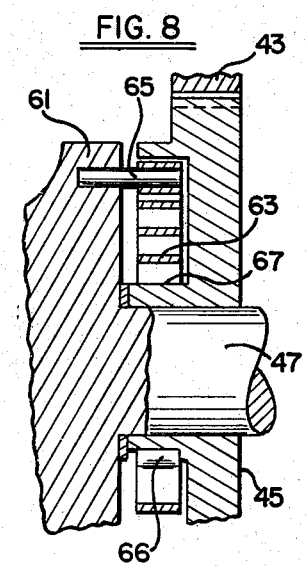
INVENTOR
CHARLES B. SIEBER
BY Joseph R. Slotnik
ATTORNEY

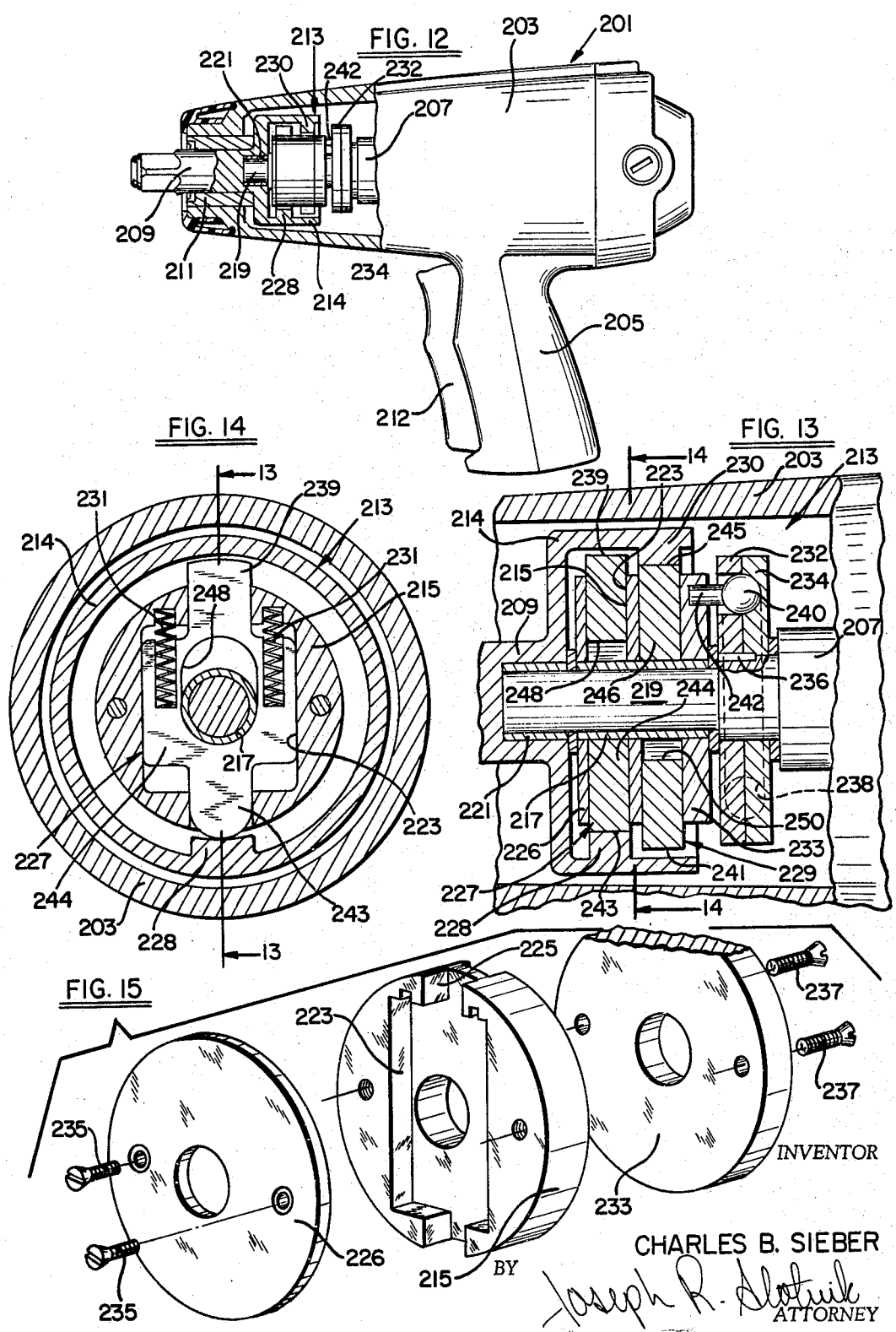

United States Patent Office 3,486,569
Patented Dec. 30, 1969

3,486,569
IMPACT MECHANISM
Charles B. Sieber, Villa Park, Ill., assignor to Black and Decker Manufacturing Company, Towson, Md., a corporation of Maryland
Filed May 6, 1968, Ser. No. 726,959
Int. Cl. B25d 15/02, 11/04
U.S. Cl. 173—93.5
30 Claims

ABSTRACT OF THE DISCLOSURE

The device disclosed herein includes a prime mover interconnected with a rotatable mass through resilient means. The mass carries striker means adapted to impact against an output member (anvil, tappet, jaw, etc.). The striker means is normally withheld from striking the output member but is so positioned to effect striking in response to cooperation of the striker means with, for example, the output member in a fashion other than impacting engagement, and in response to the rotatable mass reaching a desired angular speed level. The output member, as disclosed, can undergo either linear or arcuate movement.

SUMMARY OF THE INVENTION

The invention here relates to an impact mechanism wherein impact force is delivered to an output member by a striker carried by a rotatable mass. The striker is movable relative to the rotatable mass from a first or non-striking position, to a second position where the striker impacts directly against the output member. The striker is normally in the first position and resilient means is provided to bias the striker toward the first position when it is in the second position. The striker is novelly disposed, and means rigid with the striker is novelly constructed to cooperate with, for example, the output member, whereby the striker is positively moved toward the second position, during rotation of the rotatable mass, and is held there by centrifugal force. The rotatable mass preferably is driven through a resilient transmission whereby to absorb the shock of impact which otherwise might damage the drive train or injure the operator, and virtually neutralize centrifugal force following impact thereby permitting return of the striker to its first position.

Main objects of the present invention, therefore, are to provide an improved impact mechanism embodying a striker movably carried by a rotatable mass and adapted to impact against an output member, wherein the striker is positively moved to an impacting position through operative engagement with, for example, the output member, is held in the impacting position by centrifugal force and is retractable from the impacting position, following impact, as a result of substantial neutralization of centrifugal force.

Additional important objects of the present invention are to provide an improved impact mechanism of the above character which embodies a minimum of parts thereby reducing its size, cost and complexity, but which is capable of developing extremely high impact forces at the output member while isolating other parts of the mechanism and the operator from these forces.

Further important objects of this invention are to provide an improved mechanism of the above character which is versatile in that it may be employed with a variety of tools and other devices wherein the development of periodic impact forces is required, but which is relatively inexpensive to manufacture, rugged in construction and reliable in use.

Other objects and advantages of the present invention will become more apparent from a consideration of the detailed description to follow taken together with the drawings annexed hereto.

BRIEF DESCRIPTION OF THE DRAWINGS

FIG. 3 is an enlarged, sectional view of FIG. 2 taken along the line 3—3 thereof;

FIG. 4 is an enlarged sectional view of FIG. 2 taken along the line 4—4 thereof and showing the parts in a non-impacting position;

FIG. 5 is a view similar to FIG. 4 but showing the parts in position for impacting;

FIG. 7 is a sectional view of FIG. 4 taken along the line 7—7 thereof;

FIG. 8 is a sectional view of FIG. 3 taken along the line 8—8 thereof;

FIG. 9 is a fragmentary view, similar to FIG. 2, and illustrating a modified form of the invention;

FIG. 10 is a sectional view of FIG. 11 taken along the line 10—10 thereof;

FIG. 11 is a sectional view of FIG. 10 taken along the line 11—11 thereof;

FIG. 12 is a side elevational view, partly broken away and partly in section, illustrating still another modified form of the invention;

FIG. 13 is a sectional view of FIG. 14 taken along the line 13—13 thereof;

FIG. 14 is a sectional view of FIG. 13 taken along the line 14—14 thereof; and

FIG. 15 is an exploded, perspective view illustrating the striker carrying mass of FIGS. 12–14.

BROAD STATEMENT OF THE INVENTION

Broadly described, the present invention relates to an impact mechanism which comprises a rotatable mass, means normally driving said rotatable mass in one direction, an output member, striker means carried by said rotatable mass and having impact surface means adapted to strike said output member, said striker means being movable relative to said rotatable mass from a first position where said impact surface means clears said output member to a second position where said impact surface means strikes said output member during rotation of said rotatable mass, said striker means being normally in said first position, means for biasing said striker means toward said first position when said striker means is in said second position, said striker means having a camming portion positioned, when said striker means is in said first position, to engage cooperating means during rotation of said rotatable mass and move said striker means toward said second position, said striker means when in said second position and when said rotating mass is turning at a predetermined speed being acted upon by centrifugal force which resists said biasing means, said centrifugal force being substantially neutralized following impact whereupon said biasing means is effective to move said striker means to said first position.

In another aspect, the present invention relates to an impact mechanism for delivering periodic blows to an output member, said mechanism comprising a rotatable mass, means including resilient means for rotating said mass, said mass having means thereon movable to one position, in response to cooperative engagement with said output member, to deliver an impact blow to said output member, said last mentioned means when in said one position being acted upon by centrifugal force during rotation of said mass, said resilient means being adapted to absorb the shock of impact and effect substantial neutralization of said centrifugal force whereby to facilitate withdrawal of said impact delivering means following impact.

DETAILED DESCRIPTION

Figure 1:
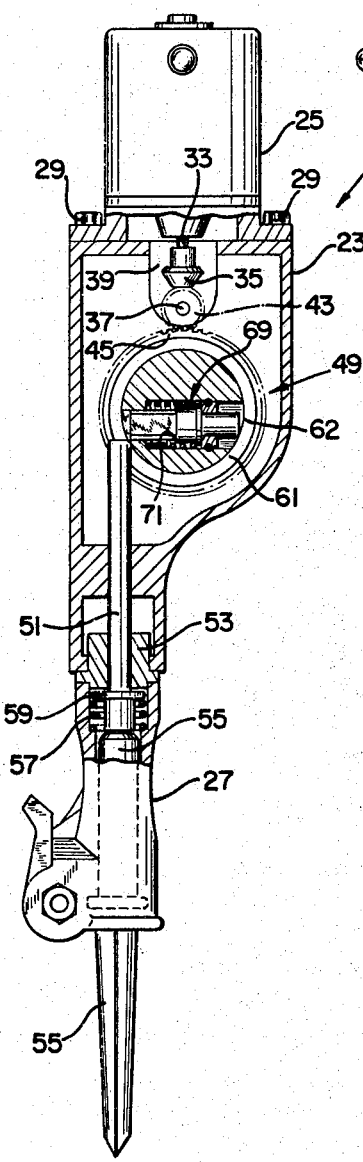
FIG. 1 is a side elevational view, partly in section, illustrating an impact tool embodying a preferred form of the present invention.
Figure 2:
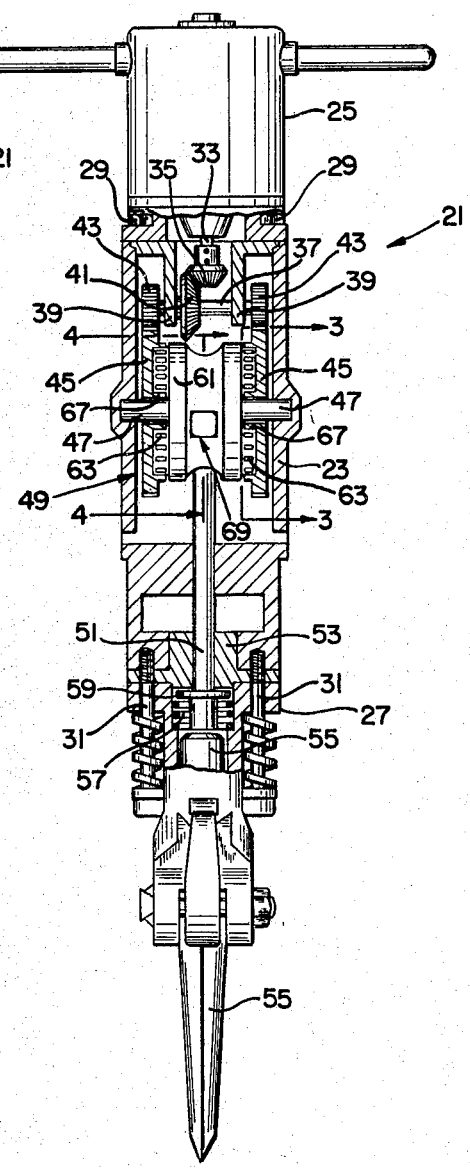
FIG. 2 is an end elevational view, partly in section, illustrating the tool and the invention of FIG. 1.

Referring now more specifically to the drawings, and particularly FIGS. 1 and 2, an impact device, here shown to be a paving breaker, is illustrated generally at 21 and is seen to include an impact housing 23 having a motor and handle housing 25 and a bit housing 27 secured thereto by screws 29, 31, respectively. An electric or other type powered motor (not shown) is positioned within the housing 25 and has a driven shaft 33 which extends into the housing 23 and has a bevel gear 35 secured thereto. A cross shaft 37 is supported by flanges 39 in the housing 23 and has a bevel gear 41 fixed thereto and driven by the bevel gear 35. A pair of pinions 43 also fixed to the cross shaft 37 drivingly engage a pair of relatively large gears 45 rotatably supported on a pair of stub axles 47 which in turn are supported at their outer ends in the housing 23. The gears 45 form part of a novel impact mechanism 49 which is adapted to deliver periodic impact blows to a tappet 51 slidably supported in a bushing 53 fixed in the lower end of the housing 23 by the screws 31. The lower end of the tappet 51 extends through the bushing 53 into the bit housing 27 adjacent a bit 55. The tappet 51 is normally held in the position shown in FIGS. 1 and 2 by a compression spring 57 which bears against a flange 59 thereon but the tappet 51 is movable downwardly against the bit 55 under the influence of the impact mechanism 49 as will be described.

Turning now to a consideration of FIGS. 3–8, together with FIGS. 1 and 2, the impact mechanism 49 is seen to include a rotatable mass comprising a wheel like member 61 fixed to or otherwise secured to the axles 47 and having a semi-circular, cross-sectional, annular, peripheral groove 62 accommodating the end of the tappet 51. The member 61 is interconnected with the gears 43 by resilient means which comprises a pair of flat spiral clock springs 63, each of which has its outer end lopped over a pin or projection 65 rigid with the member 61 which inner, bent ends 66 on the springs 63 are fixed in hubs 67 on the gears 45. Thus, the member 61 tends to turn with the gears 45 but is permitted some movement relative thereto.

The member 61 carries a striker 69 which is adapted to periodically impact against the tappet 51 during rotation of the member 61. The striker 69 is shown as disposed in a through bore 71 in the member 61 which bore 71 opens into the recess 62 and the center of which bore 71 is disposed transversely of the rotational axis of the member 61 but is displaced therefrom. The striker 69 is seen to include an intermediate cylindrical portion 73 having an enlarged radial flange 75 slidably disposed in the bore 71 which also is cylindrical in configuration.

A front or left-hand portion 77 of the striker 60, as seen in FIGS. 4, 5 and 7, is generally square in cross-section and is slidably disposed in a reducer, square cross-sectional portion 78 of the bore 71. The striker portion 71 has a bottom or impact surface 79 which, when the striker 69 is in the position shown in FIG. 5, is adapted to strike a top surface 81 on the tappet 51. It will be appreciated that because of the disposition of the striker 69 below the axis of the member 61 in this position, and because of the curved nature of the recess 62, maximum back-up support is provided for the striker portion 77 at impact. Thus, this striker portion 77 experiences only compressive stresses at impact and no shear forces as it would were the impact portion 77 not backed up by the wall of the bore portion 78 at impact. A generally-cylindrical rear or right-hand portion 83 of the striker 69 is slidably disposed in a block 85 retained in the bore 71 by pins 87. The portion 83 has an outer surface 89 which, when the striker 69 is in the position shown in FIG. 4, is adapted to cammingly engage means, for example, the tappet 51, which is positioned in its path of movement with the member 61. The striker 69 is normally biased toward the FIG. 4 position by a compression spring 91 caged between the flange 75 on the striker and a shoulder 93 in the bore 71.

The operation of this device can best be understood with reference to the sequential illustration of FIGS. 6A–6F. Thus, with the parts at rest and at low operational speeds of the member 61, the springs 91 prevents the striker 69 from moving out of its retracted position, shown in FIGS. 6A and in FIG. 4. In this position, the impact surface 79 clears the tappet surface 81, during rotation of the member 61; however, the cam surface 89 will engage the tappet 51, when the member 61 has rotated to the position shown in FIG. 6B, causing the striker 69 to be moved against the spring 91 and the striker portion 77 to extend beyond the passage 71. At low rotational speeds of the member 61, the striker 69 will not remain in this extended position but will be retracted under the force of the spring 91 so that the striker portion 77 clears the tappet 51.

Figure 6A:
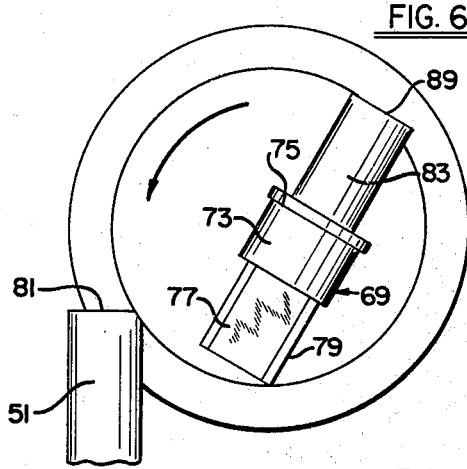
FIGS. 6A–6F are schematic views illustrating the sequence of motions undergone by the striker of the present invention.
Figure 6B:
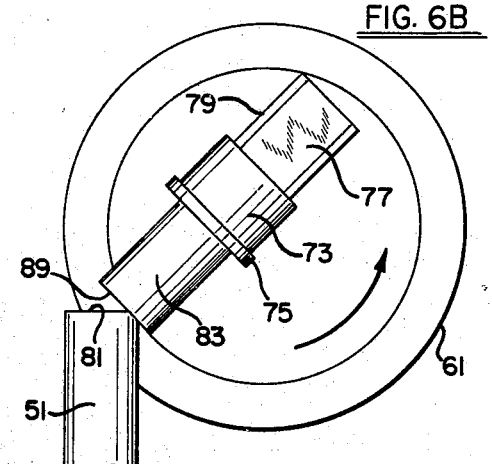
Figure 6C:
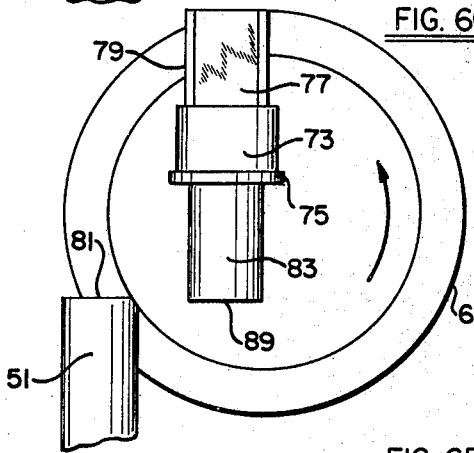
Figure 6D:
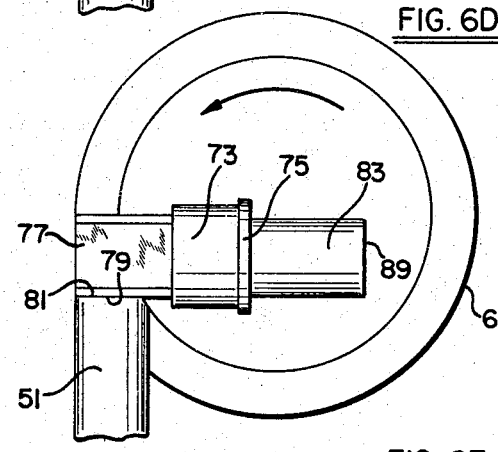

However, when the member 61 approaches its operational speed, the striker 69, after being cammed, will remain in the extended position, shown in FIG. 6C, since now the center of gravity of the striker 69 will have moved sufficiently far from the axis of rotation of the member 61 (and the striker 69) and centrifugal force on the striker 69 (as a result of the high rotational speed of the member 61) will overcome the force of the spring 91. Thereafter, continued rotation of the member 61 causes the impact surface 79 on the striker portion 77 to impact against the tappet surface 81 (FIG. 6D) to deliver an impact blow to the tappet 51.

At this point, i.e., at impact, the angular velocity of the member 61 is greatly reduced and, in fact, the member 61 may rebound. The drive motor (not shown) continues operating and the gears 45, 45 continue turning so that during this stage, the clock springs 63 "wind up." In addition, the resilient connection afforded by the clock springs 63 serves to absorb the shock at impact so that it is not transmitted back through the gears. Thus, neither the gears nor the motor will be damaged by the shock force and the operator is effectively isolated therefrom.

Figure 6E:
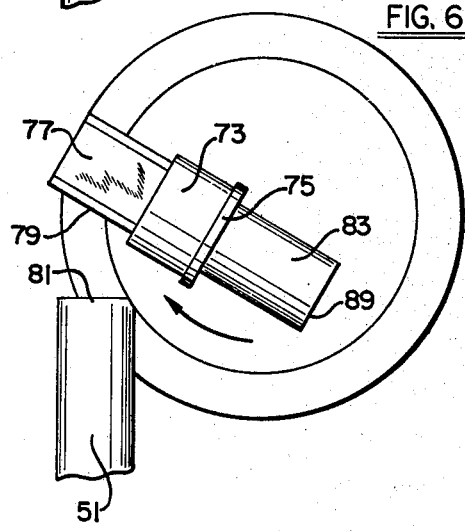
Figure 6F:
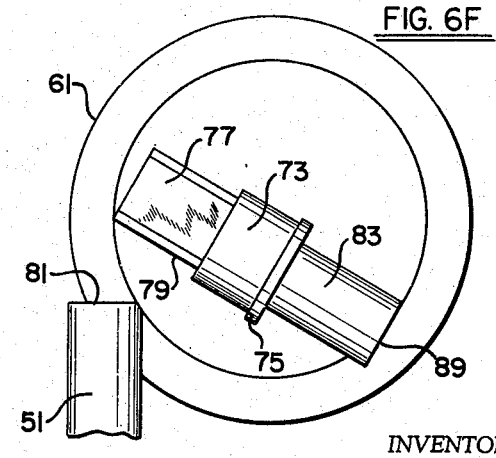

It will be appreciated that when the angular velocity of the member 61 drops off, or at rebound if such occurs as shown in exaggerated form in FIG. 6E, the effect of centrifugal force on the striker 69 is substantially neutralized and the spring 91 is then effective to retract the striker 69 within the passage 71 to the position shown in FIG. 6F so that the striker portion 77 can clear the tappet 51. The motor (not shown) has, as described above, continued to operate while the gears 45, 45 continue turning so that the clock springs 63 will have wound up. Thus, energy is stored in these springs 63 and, as the gears 45, 45 continue to rotate, is effective to cause the member 61 to accelerate quite rapidly. The angular speed of the member 61, when the camming surface 89 again engages the tappet 51, will be sufficient to hold the striker 69 in its extended position by centrifugal force and when the striker impact surface 79 again hits the tappet surface 81, the member 61 will be rotating at a speed several times that of the gears 45. The rebound-retraction-extension-impact cycle then repeats, with the striker delivering high energy, impact blows periodically to the tappet 51 for so long as the device is operated.

As described above, the clock springs 63 absorb nearly all of the shock of impact and isolate both the operator as well as the drive train therefrom. In addition, it will be appreciated that the wall of the passage 78 opposite the impact surface 79 provides solid backing for virtually all of the striker portion 77 at impact so that the forces action thereon at impact are compressive and not shear. This is extremely effective insofar as prolonging the life of the striker 69.

The modification of FIGS. 9–11 is substantially the same as that described in FIGS. 1–8 except for the resilient interconnection between the rotating mass and the drive train. Thus, a pair of gears 45A, 45A, driven by a motor (not shown) through gears 35, 41, 43, 43, are rotatably supported upon axles 47A, 47A through bearings 48A, 48A. The axles 47A, 47A are each supported in the housing 23 and are fixed to a rotatable mass comprising a wheel-like member 61A. Like the member 61 described above, the member 61A carries a striker 69 adapted to deliver periodic impact blows to a tappet 51. The striker 69 is spring retracted and is extended, through camming engagement with the tappet 51, and held so extended by centrifugal force.

Torque is transmitted from the gears 45A, 45A to the member 61A through resilient means which comprises a pair of compression springs 63A, 63B carried by each gear 45A. The member 61A has a pair of pins 65A, 65A fixed thereto and extending laterally of each side thereof. The pins 65A, 65A have spherical members 65B, 65B fixed at their outer ends and positioned between adjacent ends of each pair of springs 63A, 63B. Each set of springs 63A, 63B and spherical member 65B is received in a circular cross-sectional cavity 101 formed in a radial face of each gear 45A and a cover plate 103 secured thereto by screws 105. The cavities 101 extend nearly 360° and terminate in abutment surfaces 107 (FIG. 11). Each cover plate 103 has a circular access opening 109 to facilitate entry and removal of the spherical member 65B during assembly and disassembly.

The operation of the FIGS. 9–11 embodiment is substantially the same as that described above for FIGS. 1–8. Thus, here the drive motor (not shown) rotates the gears 45A, 45A and, through the resilient means comprising the springs 63A, 63A causes the member 61A also to rotate. The portion 77 of the striker 69 is cammed outwardly of the passage 71 through engagement with the tappet 57 and when the member 61A has reached a predetermined speed, the striker 69 is held in this extended position by centrifugal force. The surface 79 on the striker portion 77 then impacts against the tappet surface 81 whereupon the angular velocity of the member 61A approaches zero and the member 61A may rebound. This substantially neutralizes the centrifugal force so that the spring 91 can retract the striker 69 to within the passage 71. All this time, the motor (not shown) continues to operate and the gears 45A continue turning so that energy is stored in one of each set of springs 63, 63B. Thereafter, the member 61A accelerates at a rapid rate so that when the next impact blow is struck, the member 61A is turning at several times the speed of the gears 45A, 45A. Of course, the springs 63A, 63B, like the springs 63, serve as shock absorbers to isolate the shock forces at impact from the drive train and from the operator.

The embodiment of FIGS. 12–15 differs, in one respect, from that of FIGS. 1–8 and 9–11 in that, in the embodiment of FIGS. 12–15, the impact force is transmitted to a rotary output member as distinguished from a linearly movable output member as disclosed in the FIGS. 1–11 embodiments.

Thus, in FIG. 12, the invention is shown embodied in an impact wrench 201 which includes a motor and clutch housing 203 having a pendent-type handle 205 rigid therewith. A motor (not shown), which may be either electrically or pneumatically powered, reversible, mutiple speed or otherwise, is disposed within the housing 203 and is adapted to rotate a shaft 207. An output spindle 209 is rotatably supported at the front of the housing 205 by a bearing 211 and rotatably supports a reduced end 219 of the shaft 207 through a bearing 221. The spindle 209 is adapted to be driven by the shaft 207 through a novel impact clutch illustrated generally at 213. Operation of the motor and therefore the tool 201 is controlled by a pivotally mounted trigger switch 212 on the handle 205.

As shown in FIGS. 13–15, the impact clutch 213 includes an enlarged socket 214, formed integrally with the spindle 209, and having a rotatable mass or wheel-like member 215 disposed therein. The member 215 is rotatably supported upon the shaft end 219 by a bearing 217 and carries a pair of axially spaced, transversely slidable striker members 227, 229 which are adapted to impact against a pair of radially inwardly extending lugs 228, 230 formed integral with the socket 214. Alternatively, the socket 214 and the lugs 228, 230 could be replaced by a generally U-shaped yoke, in which case the yoke arms would receive the impact blows from the striker members 227, 229 in the same manner as the lugs 228, 230. The member 215 is rotatably driven by the shaft 207, preferably through a pair of separable plates 232, 234 which are fixed to the shaft 207 by a key 236. A circular cross-sectional cavity 238 is formed in the assembled plates 232, 234 and has a spherical member 240 slidable arcuately therearound. A pair of compression springs (not shown) substantially identical to the springs 63A, 63B described above for the embodiment of FIGS. 9–11, are disposed in the cavity 238 to either side of the member 240. A pin 242 interconnects the spherical member 240 to the plate 233 fixed to the member 215. Thus, torque is transmitted from the shaft 207 to the member 215 through the plates 232, 234, the springs (not shown), the spherical member 240 and the pin 242. At the same time, the springs (not shown) allow some relative rotation between the shaft 207 and the member 215 as will be described.

The strikers 227, 229 are substantially identical, having a generally rectangular main section 244, 246 slidably disposed in enlarged rectangular cavities 223, 225 formed in opposite faces of the member 215 and are held in place by cover plates 226, 233 secured to the member 215 by screws 235, 237. Alternatively, the member 215 could have a single cavity with one cover plate and with the strikers 227, 229 separated by a shim on the bearing 217. The striker main sections 244, 246 have elongated center openings 248, 250 through which the shaft portion 219 and the bearing 217 extend and which allow the striker members 227, 229 to slide transversely of the member 215.

The striker members 227, 229 have striker portions 239, 241, respectively, which are disposed in diametrically opposed relation to one another and which are adapted to simultaneously strike the lugs 228, 230 in the clutch socket 214. The striker portions 239, 241 extend radially through the member 215 but are each normally located in a position nearly flush with the outer periphery thereof and are prevented from moving out of this position by a pair of compression springs 231 (shown only for the striker member 227). At the other end of each striker member 227, 229 is a camming portion 243, 245 which are diametrically opposed to one another and which are adapted to cammingly engage, for example, the lugs 228, 230 at a rotational position of the member 215 substantially 180° in advance of when the striker portions 239, 241 impact against these lugs 228, 230. During operation, camming engagement between the camming portions 243, 245 and the lugs 228, 230 slides the striker members 227, 229 transversely of the member 215 against the springs 231 and extends the striker portions 239, 241 into the path of the lugs 228, 230. This displaces the center of gravity of each striker member 227, 229 radially past the rotational axis of the member 215 sufficiently so that when the member 215 is rotating at a predetermined angular velocity, the striker members 227, 229 will be held in this extended position by centrifugal force.

Initially, e.g., during run-down of a nut on a stud or the like, there is little resistance to turning of the spindle 209 and, therefore, the socket 214. Thus, when the camming portions 243, 245 engage the lugs 228, 230, a direct drive is established between the member 215 and the socket 214 through the camming portions 243, 245 and the lugs 228, 230. This driving relationship is assisted by virtue of the fact that with the strikers 227, 229 in their retracted positions, their centers of gravity are located to the camming sides of the shaft portion 219, and this, together with the pressure of the return springs 231, holds the strikers 227, 229 retracted. When the resistance of the nut to turning reaches a predetermined level, e.g. when the nut starts to tighten, the camming portions 243, 245 ride over the lugs 228, 230 and the impacting sequence commences.

When the camming portions 243, 245 ride over the lugs 228, 230, the strikers 227, 229 are moved transversely of the member 215, as described above so that when the member 215 has turned approximately 180° past the camming position, the striker portions 239, 241 of the members 227, 229 impact against the lugs 228, 230 and transmit rotational impact to the driven spindle 209. At impact, the angular velocity of the member 215 at least approaches zero whereupon relative rotation occurs between the shaft 207 and the member 215 by means of the spring carried between the plates 232, 234 in a fashion similar to the embodiment of FIGS. 9–11. Thus, centrifugal force which held the striker members 227, 229 in their extended or striking position, is substantially neutralized and the strikers retract under the force of the springs 231. All this time, the shaft 207 continues rotating so that energy is stored in one of the springs (not shown) within the plates 232, 234 and is then released by causing the member 215 to accelerate rapidly. Then at the next impact a high level of energy is released from the striker portions 239, 241 to the lugs 228, 230.

It will be appreciated that the construction illustrated in FIGS. 12–15 is equally adapted for operation in either rotational direction so that it is particularly useful in, for example, impact wrenches. However, like the embodiments of FIGS. 1–8 and 9–11, the environmental structure, i.e. paving breaker, impact wrench, etc., is for purposes of illustration only.

By the foregoing, there has been disclosed an improved impact mechanism calculated to fulfill the inventive objects hereinabove set forth, and while a preferred embodiment of the present invention has been illustrated and described in detail, various additions, substitutions, modifications and omissions may be made thereto without departing from the spirit of the invention as encompassed by the appended claims.

I claim:

1. An impact mechanism which comprises a rotatable mass, means normally driving said rotatable mass in one direction, an output member, striker means carried by said rotatable mass and having impact surface means adapted to strike said output member, said striker means being movable relative to said rotatable mass from a first position where said impact surface means clears said output member to a second position where said impact surface means strikes said output member during rotation of said rotatable mass, said striker means being normally in said first position, means for biasing said striker means toward said first position when said striker means is in said second position, said striker means having a camming portion positioned, when said striker means in is said first position, to engage cooperating means during rotation of said rotatable mass and move said striker means toward said second position, said striker means when in said second position and when said rotating mass is turning at a predetermined speed, being acted upon by centrifugal force which resists said biasing means, said centrifugal force being substantially neutralized following impact whereupon said biasing means is effective to move said striker means to said first position.

2. A mechanism as defined in claim 1 wherein said striker means is movable substantially transversely of the rotational axis of said rotatable mass.

3. A mechanism as defined in claim 1 wherein said striker means is slidably disposed in a through passage in said rotatable mass and transverse to the rotational axis of said rotatable mass, said biasing means including compression spring means within said passage.

4. A mechanism as defined in claim 3 wherein said striker means moves along a central axis spaced to one side of said rotational axis.

5. A mechanism as defined in claim 1 wherein said striker means comprises a rigid, elongated body having said impact surface means formed adjacent one end, said camming portion being formed at the other end of said body, said cooperating means comprising said output member.

6. A mechanism as defined in claim 5 wherein said body is movable longitudinally of its length and generally transversely of the rotational axis of said rotatable mass, said body having its center of gravity shifted from one side of said rotational axis to the other when said body moves from said first to said second position.

7. A mechanism as defined in claim 1 which includes resilient means interconnecting said driving means and said rotatable mass, said resilient means allowing said rotatable mass to rebound following impact without interruption to said driving means, whereby energy is stored in said resilient means for release at the next impact.

8. A mechanism as defined in claim 7 wherein said resilient means comprises spiral spring means interconnecting said rotatable mass and, at least one rotatable member directly driven by said driving means.

9. A mechanism as defining in claim 7 wherein said resilient means comprises compression spring means carried by at least one member directly driven by said driving means and rotatable generally coaxially with said rotatable mass, and means rigid with said rotatable mass and engaging said spring means.

10. A mechanism as defined in claim 1 wherein said rotatable mass comprises a wheel-like member having a passage extending therethrough generally transverse to its rotational axis, said striker means being slidably disposed in said passage, said member having a peripheral groove generally complementary to and accommodating at least a portion of said output member, said striker means, when in said first position, having said impact surface means extending into said groove.

11. A mechanism as defined in claim 10 wherein said striker means comprises an elongated rigid body movable within said passage along a longitudinal axis transverse to said wheel like member axis of rotation and spaced to one side thereof, said rigid body having said impact surface means formed along its length adjacent one end thereof.

12. A mechanism as defined in claim 11 wherein said camming portion comprises the end face at the other end of sai dbody, said cooperating means comprising said output member, said end face being positioned in said groove when said body is in said first position.

13. A mechanism as defined in claim 12 wherein said one end of said body is wholly within said passage when said body is in said first position, said other end of said body being wholly within said passage when said body is in said second position.

14. A mechanism as defined in claim 1 wherein said output member comprises a rigid member rotatable about an axis generally concentric with the axis of rotation of said rotatable mass.

15. A mechanism as defined in claim 14 wherein said cooperating means comprises said output member, and wherein engagement between said camming portion and said output member is effective to rotate said output mass when the resistance to rotation of said output mass is below a predetermined level.

16. A mechanism as defined in claim 14 which includes resilient means interconnecting said driving means and said rotatable mass allowing rebound of said rotatable mass after impact, without interruption of said driving means, whereby energy is stored in said resilient means for release at the next impact.

17. A mechanism as defined in claim 14 wherein said striker means is carried by said rotatable mass for movement generally transversely of its rotational axis.

18. A mechanism as defined in claim 17 wherein said striker means is positioned within a cavity in said rotatable means, said biasing means comprising compression spring means within said cavity.

19. A mechanism as defined in claim 17 wherein said impact surface means includes lug means on said member and positioned radially outwardly of said rotatable mass and engageable with said striker means.

20. A mechanism as defined in claim 19 which includes a pair of lugs at axially spaced, diametrically opposed positions on said member, said striker means including a pair of axially spaced rigid bodies each having opposite ends formed with said impact surface means and said camming portion, respectively, said bodies being disposed with their impact surface means and camming portions in diametrical opposed relation.

21. A mechanism as defined in claim 17 wherein said striker means includes at least one rigid body slidably disposed on said rotatable mass and having opposite ends adapted to extend radially beyond said rotatable mass, said impact surface means formed adjacent one end and said camming portion formed adjacent the other end of said body.

22. A mechanism as defined in claim 21 wherein said impact surface means comprises a longitudinal surface adjacent one end of said body, said camming portion being formed on the end face of the other end of said body, said cooperating means comprising said output member.

23. An impact mechanism for delivering periodic blows to an output member, said mechanism comprising a rotatable mass, means including resilient means for rotating said mass, said mass having means thereon movable to one position, in response to coperative engagement with said output member to deliver an impact below to said output member, said last mentioned means when in said one position being acted upon by centrifugal force during rotation of said mass, said resilient means being adapted to absorb the shock of impact and effect substantial neutralization of said centrifugal force whereby to facilitate withdrawal of said impact delivering means.

24. A mechanism as defined in claim 2 which includes means normally biasing said impact delivering means toward another position opposite said one position, said impact delivering means having a center of gravity which traverses the rotational axis of said rotatable mass when moving from said one to sain another position.

25. A mechanism as defined in claim 2 wherein said output member is elongated and is disposed in general tangential relation to said rotatable mass and is supported for linear movement longitudinally of its length.

26. A mechanism as defined in claim 2 wherein said impact delivering means moves linearly relative to said rotatable mass from said one to said another position, one end of said impact delivering means adapted to cammingly engage said output member, during rotation of said rotatable mass, to move said impact delivering means to said one position, whereupon the other end of said impact delivering means is caused to strike said output member with continued rotation of said rotatable mass.

27. A mechanism as defined in claim 2 wherein said output member is disposed for rotation substantially coaxially with said rotatable mass.

28. A mechanism as defined in claim 26 wherein said output member is disposed for rotation substantially coaxially with said rotatable mass, said impact delivering means being adapted to rotate said output member, through camming engagement therewith, when resistance to turning movement of said output member is below a predetermined level.

29. A mechanism as defined in claim 27 wherein said output member includes a pair of axially spaced lug means disposed radially of said rotatable mass, said impact delivering means including a pair of rigid bodies movable substantially transverse to the rotational axis of said rotatable mass and adapted to impact substantially simultaneously against said lugs.

30. A mechanism as defined in claim 27 wherein said output member has at least one lug disposed radially of said rotatable mass, said impact delivering means being movable substantially transverse to the rotational axis of said rotational mass.

References Cited

UNITED STATES PATENTS

| | | | |
|---|---|---|---|
| 2,373,664 | 4/1945 | Emery | 173—93.5 |
| 2,461,571 | 2/1949 | Robinson | 173—98 X |
| 2,539,930 | 1/1951 | Robinson | 173—93.5 |
| 2,636,583 | 4/1953 | Whitledge | 173—93.5 |
| 2,850,128 | 9/1958 | Vansittert | 173—93.5 |
| 2,888,246 | 5/1959 | Sieber | 173—98 |
| 2,947,283 | 8/1960 | Roggenburk | 173—93.5 X |
| 3,127,941 | 4/1964 | Sieber | 173—98 |
| 3,129,796 | 4/1964 | Karden | 173—93.5 |

DAVID H. BROWN, Primary Examiner

U.S. Cl. X.R.

173—98